United States Patent
Folkvang

(10) Patent No.: US 10,150,057 B2
(45) Date of Patent: Dec. 11, 2018

(54) APPARATUS AND METHOD FOR SEPARATION OF OIL FROM OIL-CONTAINING PRODUCED WATER

(71) Applicant: Cameron Systems AS, Trondheim (NO)

(72) Inventor: Jorn Folkvang, Stathelle (NO)

(73) Assignee: Cameron Systems AS, Trondheim (NO)

( * ) Notice: Subject to any disclaimer, the term of this patent is extended or adjusted under 35 U.S.C. 154(b) by 645 days.

(21) Appl. No.: 14/360,610

(22) PCT Filed: Oct. 4, 2013

(86) PCT No.: PCT/IB2013/002821
§ 371 (c)(1),
(2) Date: May 23, 2014

(87) PCT Pub. No.: WO2014/102581
PCT Pub. Date: Jul. 3, 2014

(65) Prior Publication Data
US 2015/0076083 A1    Mar. 19, 2015

(30) Foreign Application Priority Data

Dec. 28, 2012  (NO) .................................. 20121561

(51) Int. Cl.
  *B01D 17/02*   (2006.01)
  *C02F 1/40*    (2006.01)
  *C02F 103/36*  (2006.01)

(52) U.S. Cl.
  CPC ..... *B01D 17/0205* (2013.01); *B01D 17/0217* (2013.01); *C02F 1/40* (2013.01); *C02F 2103/365* (2013.01); *C02F 2301/04* (2013.01)

(58) Field of Classification Search
  CPC ... B01D 17/0205; B01D 17/0217; C02F 1/40; C02F 2301/04; C02F 2103/365
  USPC ............ 210/708, 450, 198.1, 151, 188, 194, 210/195.3, 195.4, 196, 197, 198, 218,
  (Continued)

(56) References Cited

U.S. PATENT DOCUMENTS

| 4,094,783 | A | 6/1978 | Jackson |
| 4,424,068 | A * | 1/1984 | McMillan .......... B01D 19/0057 95/243 |
| 6,379,567 | B1 | 4/2002 | Crites |

(Continued)

FOREIGN PATENT DOCUMENTS

| CN | 102361673 A | 2/2012 |
| EP | 2263767 A1 | 12/2010 |

(Continued)

OTHER PUBLICATIONS

International Search Report and Written Opinion dated Apr. 22, 2014 for PCT Application No. PCT/IB2013/002821 filed Oct. 4, 2013.

*Primary Examiner* — Madeline Gonzalez
(74) *Attorney, Agent, or Firm* — Hauptman Ham, LLP

(57) ABSTRACT

A process for separation of oil from oil-containing produced water as well as an apparatus for separation of oil from oil-containing produced water. A perforated baffle plate is arranged in a separator tank to provide for equalizing of the downwardly flow rate of produced water. The insertion of such baffle plates has shown that less oil is following the stream downward.

15 Claims, 5 Drawing Sheets

Figure 1:
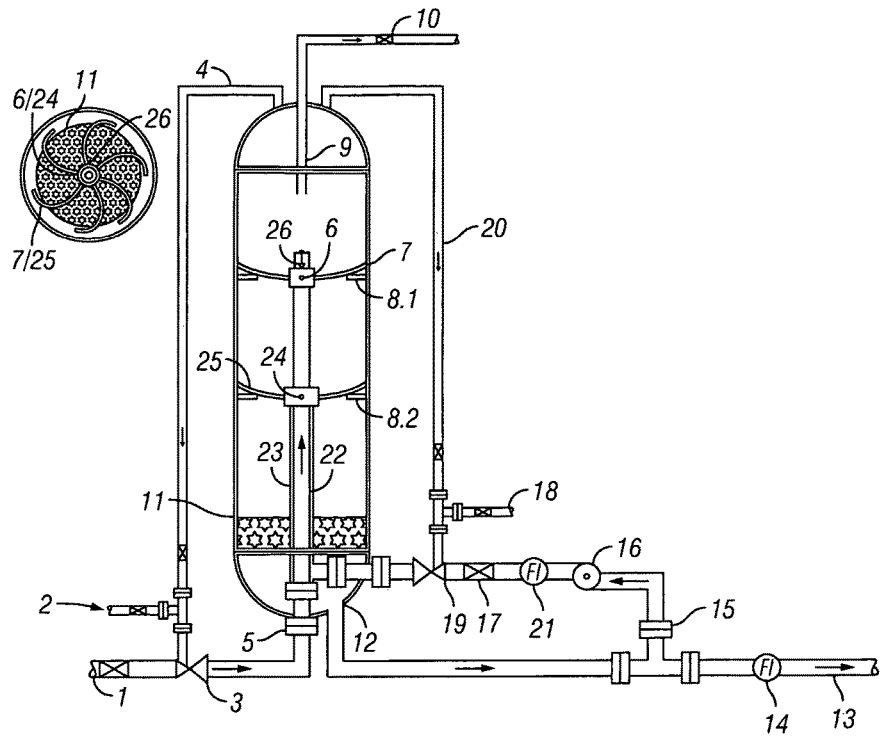

(58) Field of Classification Search
USPC ......... 210/220, 221.1, 221.2, 252, 255, 274, 210/288, 702–704, 291, 314, 335
See application file for complete search history.

(56) References Cited

U.S. PATENT DOCUMENTS

| | | | |
|---|---|---|---|
| 7,776,213 B2 * | 8/2010 | Arnaud | B01D 21/2433 137/888 |
| 2011/0290738 A1 * | 12/2011 | Folkvang | B01D 17/0205 210/708 |

FOREIGN PATENT DOCUMENTS

| | | | |
|---|---|---|---|
| GB | 2459377 A | 10/2009 | |
| WO | 2010080035 | 7/2010 | |
| WO | 20130109345 A1 | 7/2013 | |

* cited by examiner

APPARATUS AND METHOD FOR SEPARATION OF OIL FROM OIL-CONTAINING PRODUCED WATER

This application is a 35 U.S.C. § 371 national stage application of PCT/IB2013/002821, filed Oct. 4, 2013, entitled "Apparatus and Method for Separation of Oil from Oil-Containing Produced Water," which claims priority to Norwegian Patent Application No. 20121561, filed on Dec. 28, 2012, both of which are herein incorporated by reference in their entirety for all purposes.

The present invention relates to a process for separation of oil from oil-containing produced water as well as apparatus for separation of oil from oil-containing produced water.

BACKGROUND

Globally the water production associated with the oil and gas production is more than three times higher than the oil production. This gives an average water fraction of about 75% of what is produced from the wells. The water percentage continues to increase. About ten years ago was it about 70%. The water fraction increases in proportion to the oil fields being older and decreases in proportion to better methods being developed to handle the reservoir and to new fields being introduced. Simultaneously the environmental conditions are being stricter and more complicated to meet. The challenges for the operators are increasing and the need of better, diminished and more cost effective technologies arises. The costs of water treatment participate in determining how high water content it will be profitable to produce. This will also depend on the oil price.

SUMMARY

The present invention may be used to provide a purification system for produced water, including for use at oil installations onshore and offshore world wide. Produced water coming up from the well with the well stream is separated from the oil and gas, and then purified and discharged to the sea or reinjected into the reservoir. Produced water is a mixture of formation water, residuals of production chemicals and reinjected water (on installations where this is carried out). The contents and composition of produced water vary from field to field and from well to well within the same field. In addition, the composition will vary over time in one well. For example, each minute Norwegian oil platforms will treat about 400 m$^3$ water. A more mature Norwegian shelf with less oil and more water has resulted in a strong increase in produced water. In 2007 about 200 millions m$^3$ produced water were treated on the Norwegian shelf. About 90% of this was discharged to the sea.

It is an object of present invention further to improve the cleaning of the produced water and consequently lower the ppm level of oil in the purified water.

The present invention provides an apparatus for separation of oil from oil-containing produced water, wherein an embodiment of the apparatus comprises the following:
a tank including a sidewall and a hollow interior;
a gas injection line;
an inlet tube extending into the tank interior and connected with the gas injection line;
a nozzle extending from the inlet tube into a tank chamber;
a perforated baffle plate extending radially inward with respect to the tank sidewall;
an outlet in the bottom of the tank; and
an outlet at the top of the tank.

Further, an embodiment of the invention provides a method for separation of oil from oil-containing produced water, wherein the oil-containing produced water is supplied and mixed with a gas-containing component, the gas- and oil-containing produced water mixture is fed to an inlet tube extending into the tank interior, said mixture is spread via a nozzle extending from the inlet tube into a tank chamber, the downward flow of the produced water mixture is being equalized by a perforated baffle plate, oil and gas with adherent oil droplets will rise to an outlet at the top of the tank and being discharged; and cleaned water is conveyed to an outlet in the bottom of the tank.

In a further embodiment at least one guide vane is mounted under each outlet nozzle. This guide vane leads the water tangentially along the tank wall. To obtain better mixing one guide vane preferably leads the water mixture over the next outlet nozzle. At least one shroud may be mounted to guide the water along the guide vanes.

SHORT DESCRIPTION OF THE FIGURES

Figure 2:
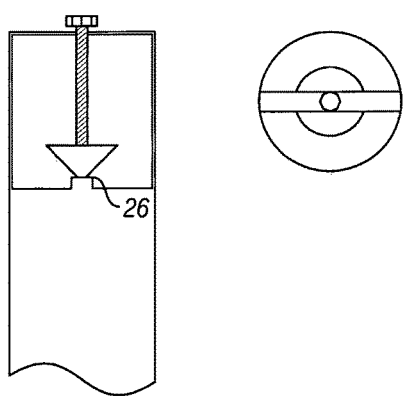
Figure 3:
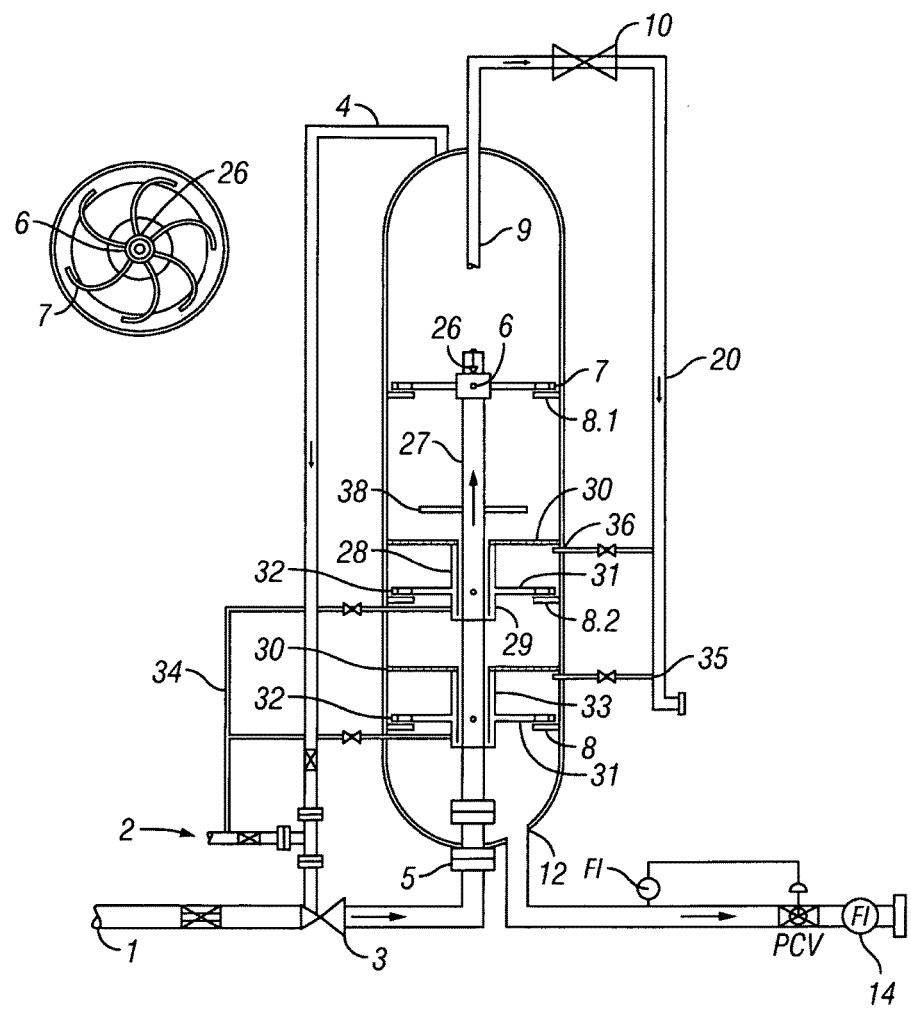
Figure 4:
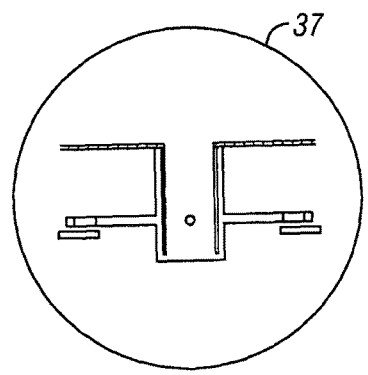
Figure 5:
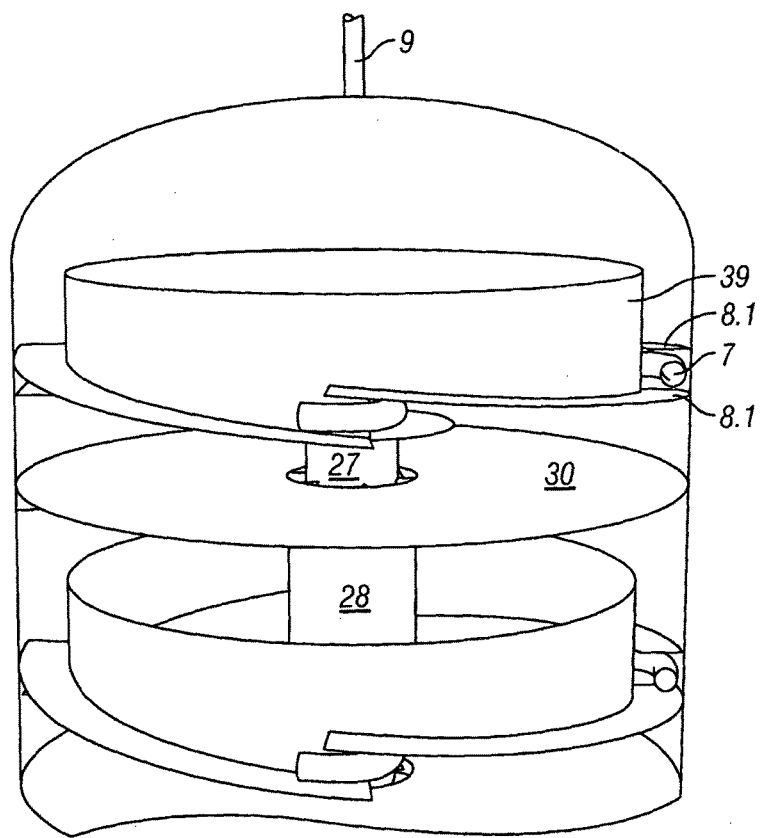
Figure 6:
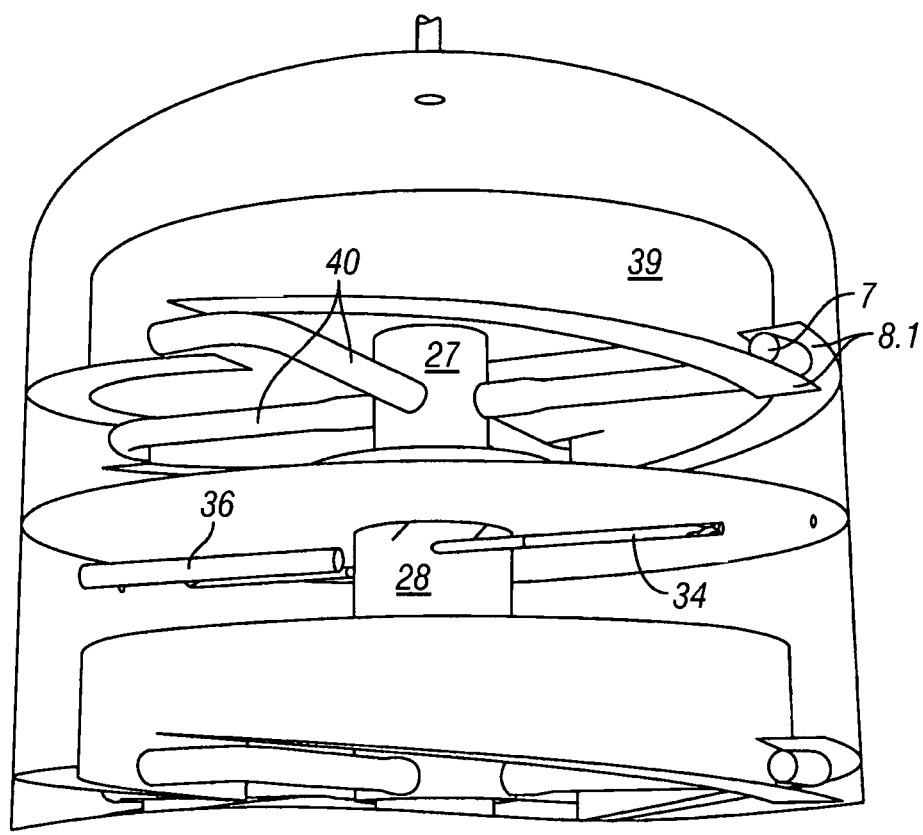
Figure 7:
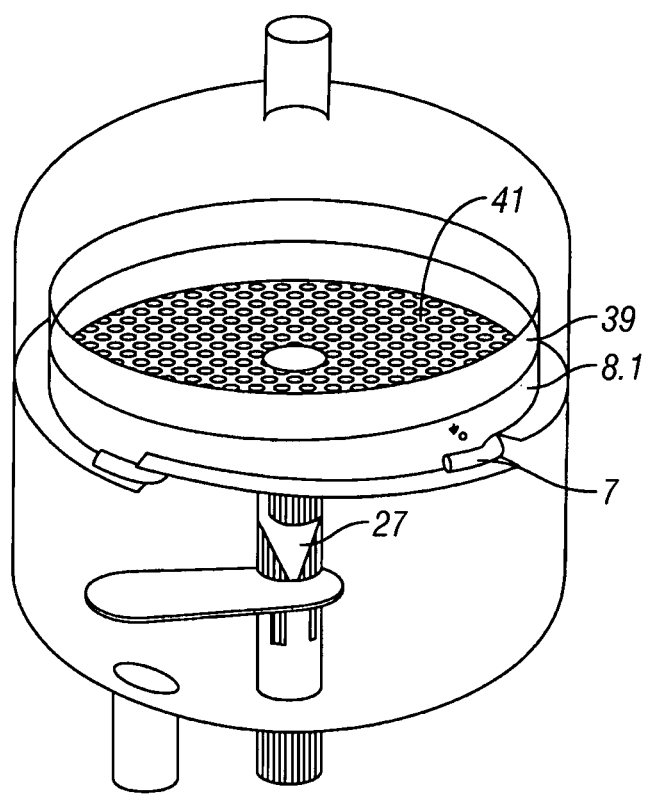

Embodiment of the invention will now be described with reference to the following figures:

FIG. 1 shows a purification system for produced water.
FIG. 2 shows a detail relating to an optional top nozzle.
FIG. 3 shows a purification system with three stages.
FIG. 4 shows a separate stage for a purification system.
FIG. 5 shows two sections inside a separator tank with a shroud in the form of an inner annular wall.
FIG. 6 shows the same sections inside a separator tank as in FIG. 5, seen from below.
FIG. 7 shows an embodiment of the invention where a perforated baffle plate is fixed to the lower part of the inside of the shroud.

DETAILED DESCRIPTION

In FIG. 1, produced water from oil/water separator or other purification equipment such as hydrocyclones, degassing tank, or similar can be fed in through inlet 1. This water is supplied with gas via gas injection line 2 and is mixed together with incoming water in a gas mixer 3. Alternatively, the gas mixer 3 is replaced with an injector (ejector) having incoming water as a driving force and which sucks gas through the tube 4 from the top of the tank. Typical gas amounts added or circulated may be approximately 3-7% of the incoming water feed flow at operation pressure. This will vary with how much residue gas is present in the incoming water. This mixture of gas and oil-containing water is fed into an inlet tube extending into the tank interior via the bottom 5. In the top of the internal tube there is a branch means 6 which distributes the water to one or more distribution tubes having outlet nozzles 7 for control of the velocity of gas/water mixture into the tank. These end tangentially along the tank wall. Because of the tangential ending of tubes/nozzles in the tank, a circulation is achieved in the tank which gives a mixing of water, gas, and oil. This results in good contact between gas bubbles and oil droplets. To evade the water from the nozzles not to go directly downwardly in the tank, but be mixed with incoming water/gas, different solutions are possible.

Guide vanes 8.1 can be mounted under each of the outlet nozzles, which are the inlets of the stream into the tank. This may lead the water over the next outlet nozzle so that water wherein great gas bubbles have been released becomes mixed with incoming water for better mixing/contact between gas and the oil droplets.

Further, a shroud 39 (shown in FIG. 5) can be arranged on the inside of the guide vane 8.1 with an angle of 30° to 150° in relation to the guide vane 8.1 to ensure that flow from one outlet nozzle 7 meets flow from the next outlet nozzle 7. In this embodiment, the shroud 39 is fixed as an inner annular wall in a nearly vertical position (ca. 90°) in relation to guide vanes 8.1. The shroud 39 may also be discontinuously arranged on the inside of the guide vane 8.1. The height of the shroud 39 can be almost any height, but generally it is preferred that it corresponds to the width of the guide vane 8.1.

According to embodiments the invention, introduction of perforated baffle plates 41 mounted in the separator tank will restrain or regulate the flow of the mixture and contribute to uniform distribution of the stream. The perforation of the baffle plate 41 may include openings of different sizes and shapes. The openings may be uniformly distributed to obtain a uniform flow rate. The preferred although not only ratio between the opening area and the solid material of the baffle plate 41 should be determined depending on the size and capacity of the tank. This opening area should be minimum 15% of the area of the baffle plate 41. FIG. 7 shows an embodiment of the invention wherein a baffle plate 41 is fixed to the inside part of the shroud, such as the lower part or any other suitable location. Perforated baffle plates can be used independently or in combinations with the guide vanes and/or shroud. For example, the baffle plate 41 may be located below the nozzle 7, guide vane 8.1, and shroud 39 to restrain or regulate flow within the entire vessel.

To achieve good mixing also in the centre of the tank an adjustable nozzle means 26 can optionally be mounted on the top of the inlet tube, see FIGS. 2 and 3. This spreads liquid/gas mixture from the centre and outwardly and mixes this with the liquid/gas mixture from the outlet nozzles 7. Gas with adherent oil droplets will rise to the surface of the liquid in the tank and be taken out together with some water in a submerged outlet 9 in the top of the tank. This discharge is controlled by means of a valve 10. The oil/water mixing ratio in this stream is dependent of the valve opening.

The water with gas bubbles having a minor ascending velocity than the water velocity downwardly in the tank may pass a "bed" of packing materials selected from the group comprising inter alia Raschig rings 11 or similar and to which gas bubbles with adhered oil is attached to, further growing together and therewith achieve a buoyancy which surpass the descending water velocity and float up to the surface. Pure (treated) water which is supplied from this "bed" will pass out in the outlet 12 in the bottom of the tank and further for emission 13 or optionally injection into the reservoir as pressure support. This amount is measured on the flow meter 14. A partial stream 15 from the water outlet from the tank will by means of a pump 16 be circulated back into the tank. The amount which is recirculated is controlled by means of a valve 17. Gas via an injection point 18 is supplied and is subsequently fed to this stream through a mixer 19 which mixes the gas into the water. Alternatively, gas can be sucked from the top of the tank 20 by means of an injector which replaces the mixer 19. Typical gas amount will may be approximately 3-7% of the incoming water feed flow at operation pressure. Typical recirculation amount will be 30 to 70% of the maximum design rate for the tank. The amount of recirculation will be read from the flow meter 21. Outside the inner tube 22 is an external tube which in both ends is sealed against the inner tube 22. Thereby a chamber 23 is formed between these tubes into which the recirculation stream 15 enters. In the top of this chamber is a branch means 24 which distribute the water to one or more tubes having outlet nozzles 25 for control of the velocity of the gas/water mixture into the tank. These end tangentially along the tank wall. To evade that the water from the nozzles does not go directly downwardly in the tank, but is mixed with incoming water/gas, at least one guide vane 8.2 is mounted below each of the inlets. This leads the water over the next inlet so that water wherein large gas bubbles having been released are being mixed with the incoming water for better mixing/contact between gas and the oil droplets. Alternatively, this stream can be distributed tangentially at any distance from the inlet tube with underlying guide vane and an external vertical wall. Alternatively, this stream can also be distributed vertically upwardly from the outlet of the tube. Alternatively, the distributions mentioned above can be directed countercurrently to the described distribution relating to the outlet nozzles 7. In this regard water being separated from the upper nozzle system/mixing supplied with pure water/gas mixture and oil which might follow this water, will again be in contact with gas bubbles which become mixed into the water and therewith achieve a new contact zone for oil/gas which results in a better purification. Alternatively, a fractional stream of incoming water can be fed through the same inlet. Water which is fed via the recirculation will follow the water phase out 12 in the bottom of the tank. To increase the size of the oil droplets in the incoming water chemicals can be added, for example flocculants, upstream from the unit.

For increased purification a number of tanks can be connected in series.

Alternatively, each separate nozzle can have an injector which sucks gas via a tube 4 from top of the tank. This tube can be situated outside or inside in the tank.

Alternatively, the inlet tube can extend from the top of the tank and downwardly. Alternatively, the water can be purified in a number of stages internally in the tank, in which water from the upper purification stage via nozzles 7 is passed via an annulus chamber 28 between the feed tube 27 and an externally located tube 29 and where the upper chamber is separated by means of plate 30, see FIG. 3. A detailed section view of the annulus chamber is shown in FIG. 4. One separator tank may include several sections separated by a plate and the annulus chamber shown in FIG. 4. Before the water enters the said annulus chamber a vortex breaker 38 is present which prevent water from the centre of the tank entering the annulus chamber. This is to avoid entrainment of oil from the top of the tank. The water is fed therefrom via the branch means 31 which distributes the water to one or more tubes having outlet nozzles 32 for control of the velocity of gas/water mixture into a novel chamber. These nozzles end tangentially along the tank wall. Alternatively, gas can be supplied to this stream via gas addition 34. A typical gas is nitrogen, hydrocarbon gas (fuel gas), $CO_2$, but are not restricted to these. Oil and gas which is separated in this chamber is removed via reject outlet 36 and is combined with reject outlets 20 and 35. Alternatively, a number of separate stages as previously described can be installed below each other where in these stages have the similar function.

FIG. 5 as described above shows a view of two sections inside a tank including a sidewall and a hollow interior. The inner annular wall/shroud 39 is fixed on the inside of the guide vanes 8.1, directed upwards. In this embodiment the annular wall is arranged almost 90° on the guide vanes 8.1. The height of the shroud 39 can be almost any height, but generally it is preferred that it corresponds to the width of the guide vane 8.1. The inlet tube 27 and the annulus chamber 28 are shown in the figure.

FIG. 6 shows the same embodiment as FIG. 5, but from a different angle. Here the guide vanes 8.1 can be seen from below. Gas can be injected through tube 34 to the annulus chamber. Oil and gas which are separated in this chamber are removed via reject outlet 36.

The present invention provides a solution which renders the installation more compact and more effective. This present solution has a number of purification stages. The purification stages mentioned above can be in the sequence and in the number which is considered suitable. This will reduce the costs, reduce necessary required space and therefore be opportune for more customers. Because of its design will it be simpler to build (fabricate) and also easier to be adapted into existing installations than conventional separators.

An embodiment or embodiments of the present process and apparatus may comprise the following:

Process and apparatus for separation of oil/hydrocarbons in liquid state or gaseous state from produced water in oil production, separation of other liquids/gases with specific weight difference and which are not dissolved in each other, comprises:

a. A tank including a sidewall and a hollow interior. The height/diameter ratio of suitable tanks is dependent on the components to be separated.

b. Where the inlet stream including components (oil and gas) to be separated, is fed into a inlet tube of the tank with the possibility of addition of gas via recirculating from the top of the tank via an ejector (eductor) or additional external gas as for example nitrogen, carbon dioxide, hydrocarbon gas which for example is separated from production separators, but which are not restricted to these.

c. A distribution means in the top of inlet tube above described in item b. and which distributes the feed into one or more distribution tubes which end tangentially along the tank wall and at least one guide vane below these extending nearly horizontally, slightly upwards. An annular wall/shroud is fixed to the guide vanes on the inside and directed upwards in an angle of between 30° and 150° entirely or partly along the lengths of the guide vane. This arrangement ensures that the stream from at least one distribution tube is directed over the next distribution tube to create a spin (circulation) in the tank and a homogenous stream which gives good mixing of gas/liquid in this portion of the tank.

d. An adjustable nozzle means mounted on the top of the inlet tube described in item b. above. This means spreads the liquid/gas mixture from the centre and outwardly in the tank and mixes with the liquid/gas mixture from the nozzle tube described in item c.

e. A tube outside the feed tube described in item c and which is sealed in both ends against the feed tube described in item c and forms an annulus chamber where a recirculated stream from the purified water outlet can be recirculated together with gas added into a mixer or with recirculated gas from the top of the tank via an ejector. Alternatively, a portion of the feed stream can be fed into the described annulus tube.

f. Where the described annulus tube has a distribution means as described in item c, but placed lower than distribution tube described in c where the feed stream can be tangentially distributed in any distance from the center tube towards the tank wall directionally controlled concurrently or countercurrently to the distribution stream described in item c. The guide vane may have an outer vertical wall which is 2 to 10 times higher in height than the distribution tube by distribution nearer a tank wall. Alternatively, the distribution tubes can be directed horizontally upwards.

g. Where purified liquid outlet is in the bottom of the tank.

h. Where downwardly flowing liquid stream passes a "bed" of gas coalescent material (packing material) where small gas bubbles with adherent droplets/particles are build together to large ones and are given buoyancy to rise to the surface.

i. Where gas and oil which has been separated are removed from the top of the tank via a submerged tube at a level of between 5 and 20% of the tank height from the top of the tank where the removed amount is regulated by means of a valve.

j. A gas "pad" in the top of the tank is formed due to the tube described in item i., which is a buffer for recirculation of gas.

k. Where the pressure in the tank is controlled by means of a valve in the outlet tube.

l. A perforated baffle plate mounted in the tank to provide for equalizing of the downwardly flow rate of produced water. The insertion of such baffle plates has shown that less oil is following the stream downwards, and the purification level of the water from the outlet 12 has increased with 50%.

It is important to notice that further purification stages can be affected in relation to the various stages and the embodiments as described in the foregoing.

When preferred embodiments of the present invention have been described, it will for the person skilled in the art be evident that other embodiments which incorporate the concepts can be used. These and other examples illustrated in the foregoing are considered as mere examples and the factual scope of the invention shall be determined from the following patent claims.

What is claimed is:

1. An apparatus for separation of oil from oil-containing water, the apparatus comprising:
   a tank including a sidewall and a hollow interior;
   a gas injection line;
   an inlet tube extending into the tank interior and connected with the gas injection line;
   a nozzle extending from the inlet tube into the tank interior;
   a perforated baffle plate in the tank interior, spaced radially inward from the tank sidewall, and including perforations extending axially through the perforated baffle plate and configured to regulate downward flow of the oil-containing water;
   an outlet in the bottom of the tank; and
   an outlet at the top of the tank.

2. The apparatus of claim 1, further comprising a guide vane below the nozzle extending radially inward with respect to the tank sidewall.

3. The apparatus of claim 2, further comprising a shroud extending along the inside of the guide vane at an angle of 30° to 150° related to the guide vane.

4. The apparatus of claim 3, wherein the perforated baffle plate is mounted inside the shroud.

5. The apparatus of claim 1, wherein the perforations of the perforated baffle plate are uniformly distributed.

6. The apparatus of claim 5, wherein the perforations comprise at least 15% of the area of the perforated baffle plate.

7. The apparatus of claim 1, wherein the perforated baffle plate extends along the plane of the horizontal cross section of the tank.

8. The apparatus of claim 1, wherein the perforated baffle plate is mounted directly to the tank wall.

9. The apparatus of claim 1, wherein the perforated baffle plate is mounted at a height below the nozzle within the tank interior.

10. The apparatus of claim 1, further comprising:
a plate separating the tank hollow interior into more than one chamber; and
more than one perforated baffle plate.

11. A tank for separation of oil from oil-containing water, the tank comprising:
an inlet tube extending into an interior of the tank;
a nozzle extending from the inlet tube within the tank interior;
a perforated baffle plate in the tank interior, spaced radially inward from a sidewall of the tank, and including perforations extending axially through the perforated baffle plate and configured to regulate downward flow of the oil-containing water;
an outlet in the bottom of the tank; and
an outlet at the top of the tank.

12. The tank of claim 11, further comprising:
a guide vane positioned below the nozzle and extending radially inward with respect to the tank sidewall;
a shroud extending along an interior of the guide vane; and
wherein the perforated baffle plate is positioned along an interior of the shroud.

13. The tank of claim 11, wherein the perforated baffle plate is mounted at a height below the nozzle within the tank interior.

14. The tank of claim 11, wherein the perforated baffle plate comprises openings, and wherein the openings comprise at least 15% of the area of the perforated baffle plate.

15. The tank of claim 11, wherein the perforated baffle plate extends along a plane of the horizontal cross section of the tank.

* * * * *